March 30, 1965  R. M. WEBSTER  3,175,840
SUSPENSION FOR VEHICLES
Filed Feb. 14, 1963  3 Sheets-Sheet 1
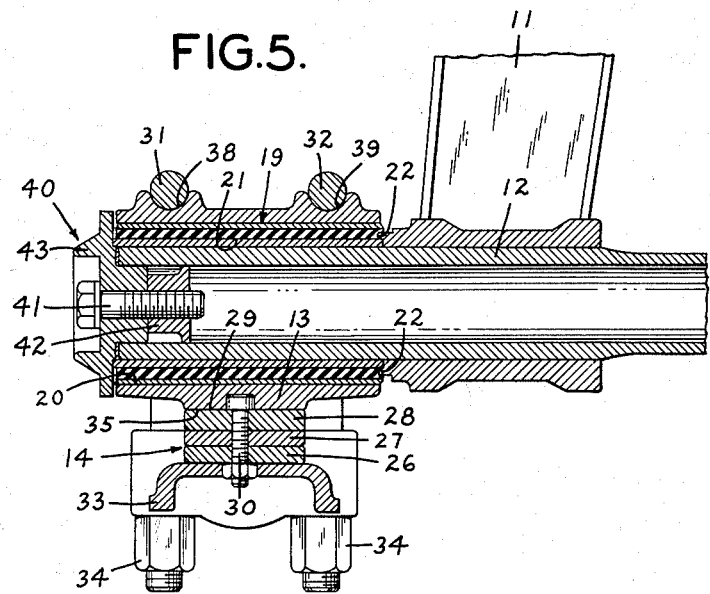
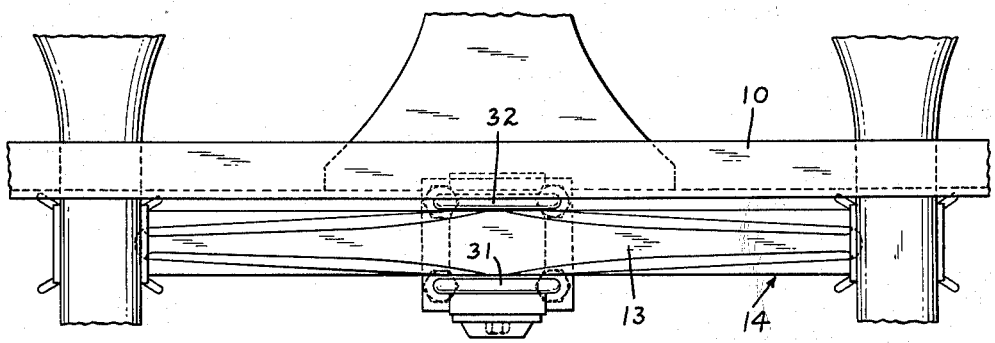
INVENTOR
ROBERT M. WEBSTER
BY
HIS ATTORNEYS

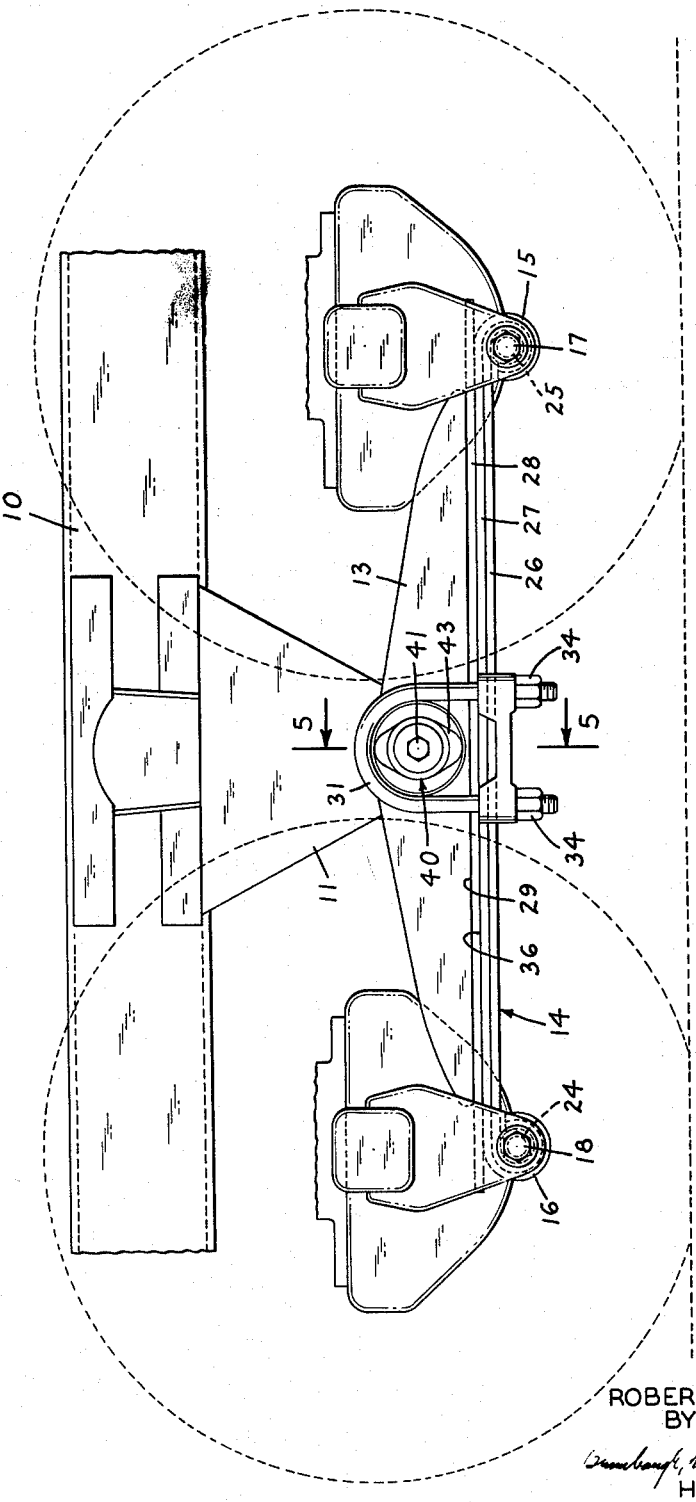

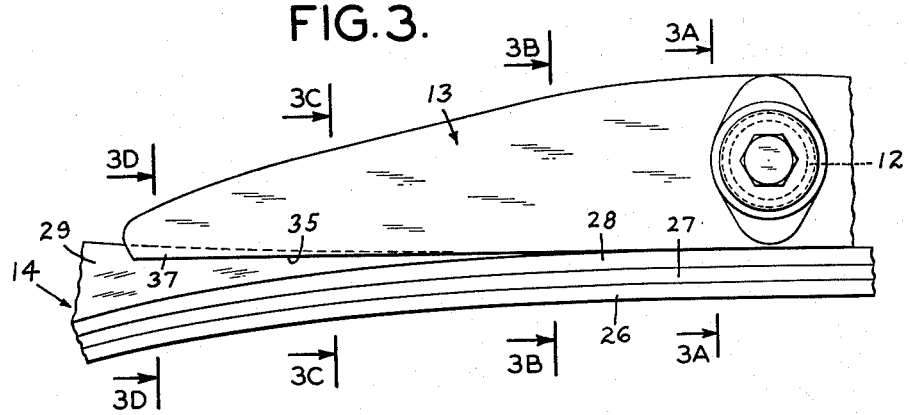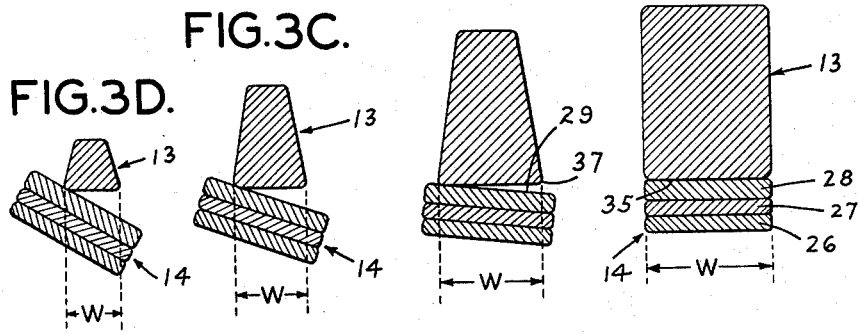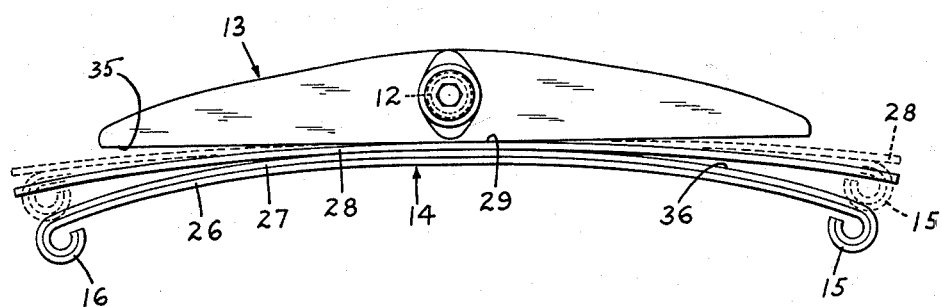

3,175,840
SUSPENSION FOR VEHICLES
Robert M. Webster, Emmaus, Pa., assignor to Mack Trucks Inc., Plainfield, N.J., a corporation of New York
Filed Feb. 14, 1963, Ser. No. 258,412
6 Claims. (Cl. 280—104.5)

This invention relates to improvements in spring suspensions, and, more particularly, to a novel and improved vehicular spring suspension for bogies and the like.

In bogie suspensions comprising the combination of a walking beam or backing member and a leaf spring assembly, the walking beam or backing member provides support under heavy load conditions for the leaf spring assembly by contact between the complementary surfaces of the upper spring leaf and the backing member, the lateral dimensions or width of the complementary surfaces of the upper leaf spring and backing member being substantially uniform throughout their longitudinal extent.

A conventional form of leaf spring assembly includes a graded leaf spring pack whereby an unloaded or lightly loaded vehicle is supported on the lower light leaves of the spring, while at moderate loads the light leaves receive additional support from one or more heavy leaves. As the vehicle weight approaches a heavy load condition, a complete inter-engagement between the backing member and the upper spring leaf is reached, forming an almost rigid suspension since the entire active upper spring surface is in contact with the lower surface of the backing member.

The rigid suspension thus formed under very heavy vehicle loads fails to provide a satisfactorily resilient suspension system. Moreover, the complete inter-engagement between the spring and the backing member restricts spring twisting to the unengaged spring extremities. The stresses thus concentrated at the spring extremities frequently cause springs to deform or rupture.

In accordance with the invention, deformation and rupture at the spring extremities from torsional stress concentrations imposed by the backing member are relieved by tapering the surface of the walking beam or backing member which is adapted to engage the spring assembly such that the engaging surface of the backing member becomes more narrow as the spring extremities are approached. Thus the spring may twist substantially along the entire length of the uppermost leaf, thereby distributing the stresses over a broad area, rather than having a stress concentration at the spring extremities. Resilient bushings may be fitted between the backing member and a trunnion attached to the vehicle frame intermediate the extremities of the leaf spring and the vehicle axle housings. These bushings may produce sufficient stability and resilience to overcome the effects of the substantially rigid suspension existing at heavy vehicle loads. Means may also be provided for restraining the spring directly beneath the backing member in a manner that may nevertheless permit the desired torsional spring movement.

For a more complete understanding of the invention, reference may be had to the following detailed description taken in conjunction with the accompanying figures of the drawings, in which:

FIGURE 1 is a plan view of an exemplary embodiment of a portion of a vehicle suspension, in accordance with the invention, supporting a heavy load;

FIG. 2 is a side elevational view of the exemplary embodiment of the vehicle suspension shown in FIG. 1, supporting a heavy load;

FIG. 3 is a side view of an exemplary embodiment of a portion of a backing member and spring in fully loaded, twisted relationship, according to the invention, with removed full sections 3A, 3B, 3C and 3D of the backing member and spring taken at their respective stations on FIG. 3 and looking in the direction of the arrows;

FIG. 4 is a side view in alternate positions of one exemplary embodiment of a backing member and a graded leaf spring pack, according to the invention, showing the relationship between the backing member and the leaf spring pack at light and moderate vehicle loads; and FIG. 5 is a view in full section of a portion of the exemplary embodiment of the vehicle suspension taken along the line 5—5 of FIG. 2 and looking in the direction of the arrows.

The frame of the vehicle has a longitudinally extending side frame member 10 connected by a suitable trunnion bracket 11 to a transverse trunnion shaft 12, which may be fixedly positioned therein by a shrink fit. The trunnion shaft 12 pivotally engages an elongated backing member or walking beam 13 adapted to engage in varying extent a semielliptic spring means or assembly 14, the backing member 13 having a centrally disposed transverse aperture 20 adapted to receive the trunnion shaft 12. The spring assembly 14 has at its extremities two eyes 15 and 16 respectively engaging transversely disposed trunnion means 17 and 18, shown in FIG. 2, forming a part of or depending from the respective axle housings of a bogie.

As shown in FIG. 5, a resilient bushing means 19 is pressed into the transverse aperture 20 formed in the backing member 13 and about the trunnion shaft 12. The bushing means 19 has a plurality of concentric layers, the intermediate layer being composed of rubber or some similar resilient material to permit deflection thereof in response to irregularities in terrain, and inner member 21 clamped to the trunnion shaft 12 by a protrusion 22 on the trunnion bracket 11.

A conventional seating lock fastener 40 comprising a screw 41, a drag member 42 and an oval retainer 43 is seated substantially within a hollow portion of the trunnion shaft 12. The fastener 40 also locks the backing member 13 on the trunnion shaft 12 and prevents sidewise movement of the backing member relative to the trunnion shaft. Alternatively, the inner member 21 of the bushing means 19 may be dowelled to the trunnion shaft 12. Similar bushing means 24 and 25 shown in FIG. 2, are provided within the eyes 16 and 15, respectively, so that the pivotal engagement of the spring assembly 14 with the axle housing trunnion means 17 and 18 permits deflection of the bushings 24 and 25 due to change in angle as the spring assembly is deflected.

As shown in FIG. 4, the spring assembly 14 is a semielliptic graded leaf pack of substantially uniform width designed with a constant radius in order that a constant stress can be obtained as contact is progressively made between the backing member and the top leaf. The spring assembly 14 comprises two lower leaves 26 and 27 of relatively thin cross-section. The leaves 26 and 27 are, in an unloaded condition, each provided with a longitudinal curvature of substantially the same radius. The curvature is such that the extremities of the leaves 26 and 27 at the eyes 15 and 16 are lower than the central portions of the leaves positioned directly under the trunnion shaft 12. The equal radii of curvature for each of the leaves, 26 and 27, permits the two leaves to nest closely against each other. An upper leaf 28, having a top surface 29 adapted to lie substantially contiguously with a flat lower surface 35 of the backing member 13, is of comparatively greater thickness and different length than the leaves 26 and 27. The upper leaf 28, while substantially the same width as the leaves 26 and 27, is provided with a somewhat greater radius of curvature and is preferably designed to develop the same stress when flattened along the backing member 13. The complete spring assembly 14 is fastened together by a bolt 30, vertically penetrating centrally disposed and aligned apertures formed in the leaves 26, 27 and 28 as shown in FIG. 5.

The spring assembly 14 is fixed in longitudinal position under the backing member 13 by two U bolts 31 and 32 positioned about respective lateral bosses thereon surrounding the trunnion shaft 12. The shanks of the bolts 31 and 32 downwardly depend along respective opposite, vertical sides of the spring assembly 14, the bight of each of the bolts fitting in grooves 38 and 39 formed in the lateral bosses of the backing member 13 circumscribing the trunnion shaft 12, to engage a transverse clamp 33 positioned below the spring assembly 14 and draw the spring assembly 14 against the backing member 13, thereby locking the spring assembly 14 to the backing member 13 and eliminating slip between the spring assembly and the backing member.

As shown in FIGS. 1, 3 and 3A–3D, inclusive, the flat lower surface 35 of the backing member 13, which is adapted to be directly opposed to the uppermost surface 29 of the spring assembly 14, has a width, W, which decreases progressively relative to the substantially uniform width of the spring member from the central portions of the leaves 26, 27 and 28 outwardly toward the longitudinal extremities of the backing member 13, to provide a longitudinal taper.

In operation (FIG. 4), as the weight of the vehicle is increased by the addition of fuel, passengers, freight or the like, the relatively light, lower leaves 26 and 27, bear the initial burden as shown in solid lines. As the weight of the vehicle is further increased, the curvature of the lower leaves 26 and 27 begins to flatten out and an upper surface 36 of the leaf 27 nests against a progressively increasing area of the opposed surface of the heavy leaf 28, as shown in broken lines in FIG. 4.

When the upper surface 29 of the heavy leaf 28 is fully engaged with the backing member 13, as seen in FIG. 2, the spring assembly 14 lies substantially rigid against the backing member 13 except for relative twisting, and suspension is provided primarily by the resilient bushing means 24 and 25 at the axle housing trunnions 18 and 17, the resilient bushing means 19 at the trunnion shaft 12 and the tires of the vehicle.

Under heavy loads, when the spring assembly 14 nests continuously and firmly against the lower surface 35 of the backing member 13, as shown in FIG. 2, the tapered form of the backing member 13 permits the spring assembly 14 to twist (FIG. 3) transversely about the tapered backing member 13 along at least half the length of the spring assembly 14 in response to torsional forces, imparted to the spring assembly 14 by roughness in the road or the like. When under torsional stress the angle between the contiguous surfaces of the spring assembly 14 and the backing member 13, progressively increases with the decreasing width W of the backing member 13 as the distance from the rigidly fastened center portion of the spring assembly 14 increases as shown in the transverse sectional views taken at stations 3A, 3B, 3C and 3D of FIG. 3. Thus the tapered backing member 13 permits the torsional stresses created within the spring assembly 14 to be distributed along the length of the spring assembly from the central portion of the backing member 13, as seen in FIG. 3A, to the backing member extremity, shown in FIG. 3D; and avoids the excessive stress concentrations at the extremities of the spring assembly naturally resulting from the arrested angular movement of the spring assembly imposed by conventional untapered backing members.

Thus there is provided, in accordance with the invention, a novel and improved vehicular spring suspension wherein the distribution of torsional stresses achieved by the tapered backing member 13 increases the ultimate loading to which the spring assembly may be subjected before the elastic limit of the spring member material is exceeded by preventing stress concentrations which would lead to localized overloadings. Moreover, the use of rounded edges 37 on the lower surface 35 of the backing member 13 permits the spring assembly 14 to twist freely about the spring assembly centerline, dampening oscillations induced by twisting without transmitting the oscillations to the vehicle.

It will be obvious to those skilled in the art that the above described exemplary embodiments are susceptible of modification and variation without departing from the spirit and scope of the invention. For example, the tapered backing member may be used with flat, plate and elliptic spring members or assemblies as well as the semi-elliptic spring assembly herein described. Thus the invention is not deemed to be limited except as defined by the appended claims.

I claim:

1. A vehicular suspension comprising an elongated spring means having a contact surface and an outer end and an elongated backing member, having an outer end adjacent to said end of said spring means and a contact surface opposing said contact surface of said spring means for progressively contacting said contact surface of said spring means in varying degree along its longitudinal extent dependent upon vehicle load conditions and along its full extent when under relatively heavy load, said contact surface of said backing member tapering in width toward said outer end thereof and said outer end of said contact surface of said backing member having a width less than the width of said contact surface of said spring means opposite thereto to enable torsional movement of said spring means relative to said backing member under said vehicle load conditions and heavy load.

2. A vehicular suspension, comprising an elongated spring means having a contact surface and an outer end of substantially uniform width, and an elongated backing member having an outer end adjacent to said end of said spring means and a contact surface opposing said contact surface of said spring means for progressively contacting said contact surface of said spring means in varying degree along its longitudinal extent dependent upon vehicle load conditions and along its full extent when under relatively heavy load, means for fixedly mounting a central portion of said contact surface of said backing member at a point intermediate the extremities thereof contiguously with a central portion of said contact surface of said elongated spring means, said contact surface of said backing member tapering in width of progressively decreasing size along longitudinal extents toward said outer end thereof and said outer end of said contact surface of said backing member having a width less than the width of said contact surface of said spring means opposite thereto to enable torsional movement of said spring means relative to said backing member under said vehicle load conditions and heavy load.

3. A bogie suspension for a vehicle chassis and a bogie having a pair of longitudinally displaced axle housings, comprising an elongated spring means having a contact surface and an outer end, and an elongated backing member having an outer end adjacent to said end of said spring means a contact surface opposing said contact surface of said spring means for progressively contacting said contact surface of said spring means in varying degree along its longitudinal extent dependent upon vehicle load conditions and along its full extent when under relatively heavy load, trunion means mounted on the vehicle chassis for pivotally supporting said elongated backing member at a central portion thereof intermediate its extremities, means for respectively connecting the extremities of said elongated spring means to the pair of axle housings, and means for fixedly connecting a central portion of said elongated spring means to said central portion of said backing member with said contact surfaces of said central portions of said spring means and said backing member in contiguous relation, said contact surface of said backing member tapering in width toward said outer end thereof and said outer end of said contact surface of said backing member having a width less than the width of said contact surface of said spring means opposite thereto to enable torsional movement of said spring means relative to said backing member under said vehicle load conditions and heavy load.

4. A bogie suspension as claimed in claim 3, including resilient bushing means interposed between said trunnion means and said elongated backing member.

5. A bogie suspension as claimed in claim 3, wherein said means for connecting the extremities of said elongated spring means to the pair of axle housings includes resilient bushing means.

6. A bogie suspension for a vehicle chassis and a bogie having a pair of longitudinally displaced axle housings, comprising an elongated spring assembly having a plurality of spring leaves, the upper one of said plurality of leaves having a contact surface of substantially uniform width and an outer end with free extremities, at least the lowermost of said plurality of leaves having eyes formed at the respective extremities thereof for connecting said spring assembly to respective axle housings, the radius of curvature of said upper spring leaf being somewhat greater than that of said lowermost spring leaf; an elongated backing member having an outer end adjacent to said end of said spring assembly and contact surface opposing said contact surface of said spring assembly for progressively contacting said contact surface of said spring assembly in varying degree along its longitudinal extent dependent upon vehicle load conditions and along its full extent when under relatively heavy load, trunnion means mounted on the vehicle chassis for pivotally supporting said elongated backing member at a central portion thereof intermediate its extremities; resilient bushing means interposed between said trunnion means and said elongated backing means; means including resilient bushing means for respectively connecting said eyes of said elongated spring assembly to the pair of axle housings; and means for fixedly connecting a central portion of said elongated spring assembly to said central portion of said backing member with said contact surfaces of said central portions of said spring assembly and said backing member in contiguous relation; said contact surface of said backing member tapering in width toward said outer end thereof and said outer end of said contact surface of said backing member having a width less than the width of said contact surface of said spring assembly opposite thereof to enable torsional movement of said spring assembly relative to backing member under said vehicle load conditions and heavy load.

References Cited in the file of this patent

UNITED STATES PATENTS

| | | |
|---|---|---|
| 2,550,331 | Crookston | Apr. 24, 1951 |
| 2,810,587 | Boughner | Oct. 22, 1957 |
| 2,843,395 | Brumbaugh | July 15, 1958 |